United States Patent
Frank

(10) Patent No.: US 12,023,993 B2
(45) Date of Patent: Jul. 2, 2024

(54) THERMAL MANAGEMENT SYSTEM FOR A MOTOR VEHICLE, METHOD FOR THE THERMAL MANAGEMENT OF A MOTOR VEHICLE, AND MOTOR VEHICLE HAVING A THERMAL MANAGEMENT SYSTEM

(71) Applicant: Bayerische Motoren Werke Aktiengesellschaft, Munich (DE)

(72) Inventor: Torsten Frank, Vatterstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 358 days.

(21) Appl. No.: 17/594,425

(22) PCT Filed: Jul. 1, 2020

(86) PCT No.: PCT/EP2020/068446
§ 371 (c)(1),
(2) Date: Oct. 15, 2021

(87) PCT Pub. No.: WO2021/018501
PCT Pub. Date: Feb. 4, 2021

(65) Prior Publication Data
US 2022/0185072 A1 Jun. 16, 2022

(30) Foreign Application Priority Data
Jul. 26, 2019 (DE) ................... 10 2019 120 229.9

(51) Int. Cl.
*B60H 1/32* (2006.01)
*B60H 1/22* (2006.01)

(52) U.S. Cl.
CPC ......... *B60H 1/3227* (2013.01); *B60H 1/2215* (2013.01)

(58) Field of Classification Search
CPC ............... B60H 1/3227; B60H 1/2215; B60H 1/00885; B60H 2001/00307;
(Continued)

(56) References Cited

U.S. PATENT DOCUMENTS 10,875,382 B2 * 12/2020 Ben Ahmed ........... B60H 1/143
11,065,937 B2 * 7/2021 Allgaeuer .......... B60H 1/00385
(Continued)

FOREIGN PATENT DOCUMENTS

| CN | 103568777 A | 2/2014 |
| CN | 104661841 A | 5/2015 |

(Continued)

OTHER PUBLICATIONS

Chinese-language Office Action issued in Chinese Application No. 202080031391.7 dated Sep. 19, 2023 with English translation (14 pages).
(Continued)

*Primary Examiner* — Marc E Norman
(74) *Attorney, Agent, or Firm* — Crowell & Moring LLP

(57) ABSTRACT

A thermal management system for a motor vehicle includes a heating circuit with an interior compartment heat exchanger; a refrigeration circuit with a compressor; a condenser which is arranged in the heating circuit and in the refrigeration circuit, wherein the heating circuit and the refrigeration circuit are fluidically separated from one another in the condenser; and a chiller, which is arranged in the heating circuit and in the refrigeration circuit. The heating circuit and the refrigeration circuit are fluidically separated from one another in the chiller. In a heating mode, the interior compartment heat exchanger, the chiller and the condenser are connected in series in the heating circuit.

15 Claims, 2 Drawing Sheets

(58) Field of Classification Search
CPC .......... B60H 2001/00928; B60H 2001/00957; B60K 2001/008
See application file for complete search history.

(56) References Cited

U.S. PATENT DOCUMENTS

| | | |
|---|---|---|
| 2012/0247716 A1 | 10/2012 | Galtz et al. |
| 2014/0020415 A1 | 1/2014 | Heyl |
| 2015/0276281 A1 | 10/2015 | Satzger et al. |
| 2017/0008407 A1 | 1/2017 | Porras et al. |
| 2017/0050493 A1 | 2/2017 | Nishikawa et al. |
| 2018/0236842 A1 | 8/2018 | Allgaeuer et al. |
| 2018/0319246 A1 | 11/2018 | Allgaeuer et al. |
| 2020/0276882 A1 | 9/2020 | Allgaeuer et al. |

FOREIGN PATENT DOCUMENTS

| | | |
|---|---|---|
| CN | 106335387 A | 1/2017 |
| DE | 10 2011 016 070 A1 | 10/2012 |
| DE | 10 2012 024 080 A1 | 3/2014 |
| DE | 10 2013 206 630 A1 | 10/2014 |
| DE | 10 2015 200 334 A1 | 7/2016 |
| DE | 11 2015 002 259 T5 | 2/2017 |
| DE | 10 2015 220 623 A1 | 4/2017 |
| DE | 10 2015 016 241 A1 | 6/2017 |
| DE | 10 2016 200 362 A1 | 7/2017 |
| DE | 10 2017 220 376 A1 | 5/2019 |
| WO | WO 2011/076199 A1 | 6/2011 |

OTHER PUBLICATIONS

Chinese-language Office Action issued in Chinese Application No. 202080031391.7 dated May 30, 2023 with English translation (16 pages).

International Search Report (PCT/ISA/210) issued in PCT Application No. PCT/EP2020/068446 dated Nov. 19, 2020 with English translation (six (6) pages).

German-language Written Opinion (PCT/ISA/237) issued in PCT Application No. PCT/EP2020/068446 dated Nov. 19, 2020 (seven (7) pages).

German-language Search Report issued in German Application No. 10 2019 120 229.9 dated Mar. 3, 2020 with a partial English translation (10 pages).

* cited by examiner

THERMAL MANAGEMENT SYSTEM FOR A MOTOR VEHICLE, METHOD FOR THE THERMAL MANAGEMENT OF A MOTOR VEHICLE, AND MOTOR VEHICLE HAVING A THERMAL MANAGEMENT SYSTEM

BACKGROUND AND SUMMARY OF THE INVENTION

The invention relates to a thermal management system for a motor vehicle, to a method for the thermal management of a vehicle, and to a motor vehicle having such a thermal management system.

Thermal management systems for electrified motor vehicles are known, in which a coolant is heated by way of an electrical heater and the heated coolant is supplied to an interior compartment heat exchanger in order to heat a vehicle passenger compartment. In such thermal management systems, the electrical heater is configured for a heating mode at cold outside temperatures, in which no waste heat is available from an electrical energy store and an electric motor, and therefore the thermal energy for the heating mode has to be supplied exclusively by the electrical heater. The electrical heater has to be designed to be of an appropriately large size. However, it would be desirable, for cost and space reasons, to use an electrical heater which is smaller in terms of structure and/or output.

It is therefore an object of the present invention to at least partially eliminate the disadvantages mentioned above. This object is achieved by the claimed invention.

According to one exemplary embodiment of the invention, a thermal management system for a motor vehicle is provided, having a heating circuit with an interior compartment heat exchanger; a refrigeration circuit with a compressor; a condenser which is arranged in the heating circuit and in the refrigeration circuit, wherein the heating circuit and the refrigeration circuit are fluidically separated from one another in the condenser; and a chiller which is arranged in the heating circuit and in the refrigeration circuit, wherein the heating circuit and the refrigeration circuit are fluidically separated from one another in the chiller, wherein, in a heating mode, the interior compartment heat exchanger, the chiller and the condenser are connected in series in the heating circuit. This exemplary embodiment affords the advantage that a pseudo thermal pump mode is thereby made possible, i.e. the refrigeration circuit can be operated although currently no waste heat is being generated by an energy store, a power electronic system or an electric motor. On the contrary, the refrigeration circuit is operated exclusively in order to use thermal energy, which is generated by the electrical compressor, for heating purposes. Said thermal energy provided by the electrical compressor makes it possible to design an electrical heater to be smaller in terms of construction and/or output, which saves costs and/or construction space. If there is little requirement for heating power, the thermal energy generated by the electrical compressor may even be sufficient.

In particular, it is provided that the heating circuit has an electrical heater, wherein, in the heating mode, the electrical heater, the interior compartment heat exchanger, the chiller and the condenser are connected in series in the heating circuit.

According to a further exemplary embodiment of the invention, in the heating mode, the electrical heater, the interior compartment heat exchanger, the chiller and the condenser are connected in series in this sequence in the heating circuit.

According to a further exemplary embodiment of the invention, the thermal management system furthermore has an electric duct heater (EDH) heating circuit which branches off from the heating circuit downstream of the interior compartment heat exchanger and leads again into the heating circuit upstream of the condenser. Said EDH heating circuit is smaller than the heating circuit and is suitable for operating states in which there is a smaller requirement for heating and the thermal energy that is additionally suppliable by the electrical compressor is not required.

According to a further exemplary embodiment of the invention, the thermal management system is formed furthermore with a high-voltage storage (HVS) section which has an electrical energy store and which branches off from the heating circuit downstream of the chiller and leads again into the heating circuit upstream of the chiller, wherein the HVS section is optionally activatable and deactivatable. This permits an operating mode in which the energy store can be cooled while the waste heat from the energy store is supplied via the chiller, the refrigeration circuit and the condenser to the interior compartment heat exchanger in order thus to heat the occupant compartment. Furthermore, by arranging the energy store downstream of the chiller, an admission temperature of the coolant at the energy store can be lowered.

According to a further exemplary embodiment of the invention, a volume fraction of the coolant branching off from the heating circuit into the HVS section is adjustable. Thus, by adjusting a volumetric flow of coolant through the HVS section, a control option can be created by way of which different admission temperatures can be achieved at the energy store and at the interior compartment heat exchanger although only one single electrical heater is used.

According to a further exemplary embodiment of the invention, a control valve is provided at the junction of the HVS section.

According to a further exemplary embodiment of the invention, a control valve is provided between the interior compartment heat exchanger and the chiller.

Furthermore, the invention, according to one exemplary embodiment, provides a method for the thermal management of a motor vehicle, having the steps of circulating coolant in a heating circuit by a series connection having an interior compartment heat exchanger, a chiller and a condenser; simultaneously circulating refrigerant in a refrigeration circuit by a series connection having a compressor, the condenser and the chiller. This exemplary embodiment affords the advantages which have already been described above in conjunction with the thermal management.

In particular, it is provided here that, in the step of circulating coolant in the heating circuit, the coolant is circulated by a series connection having an electrical heater, the interior compartment heat exchanger, the chiller and the condenser.

According to a further exemplary embodiment, the method has the steps of: removing heating circuit thermal energy from the heating circuit by the chiller; transmitting the heating circuit thermal energy from the chiller via the refrigeration circuit into the condenser; subjecting the condenser to additional compressor thermal energy originating from an output from the compressor, and introducing the heating circuit thermal energy and the compressor thermal energy via the condenser into the heating circuit.

According to a further exemplary embodiment of the method, the heating circuit thermal energy originates exclusively from the electrical heater.

According to a further exemplary embodiment of the method, during the circulation of coolant in the heating circuit, the flow passes through the electrical heater, the interior compartment heat exchanger, the chiller and the condenser in this sequence.

According to a further exemplary embodiment, the method has the step of optionally branching off coolant from the heating circuit downstream of the chiller, guiding the coolant through an electrical energy store and re-introducing the coolant into the heating circuit upstream of the chiller. In particular having the step of adjusting a volume fraction of coolant that is branched off from the heating circuit into the HVS section.

Furthermore, an exemplary embodiment of the present invention provides a motor vehicle having such a thermal management system.

A preferred exemplary embodiment of the present invention is described below with reference to the attached drawings.

DETAILED DESCRIPTION OF THE DRAWINGS

Figure 1:
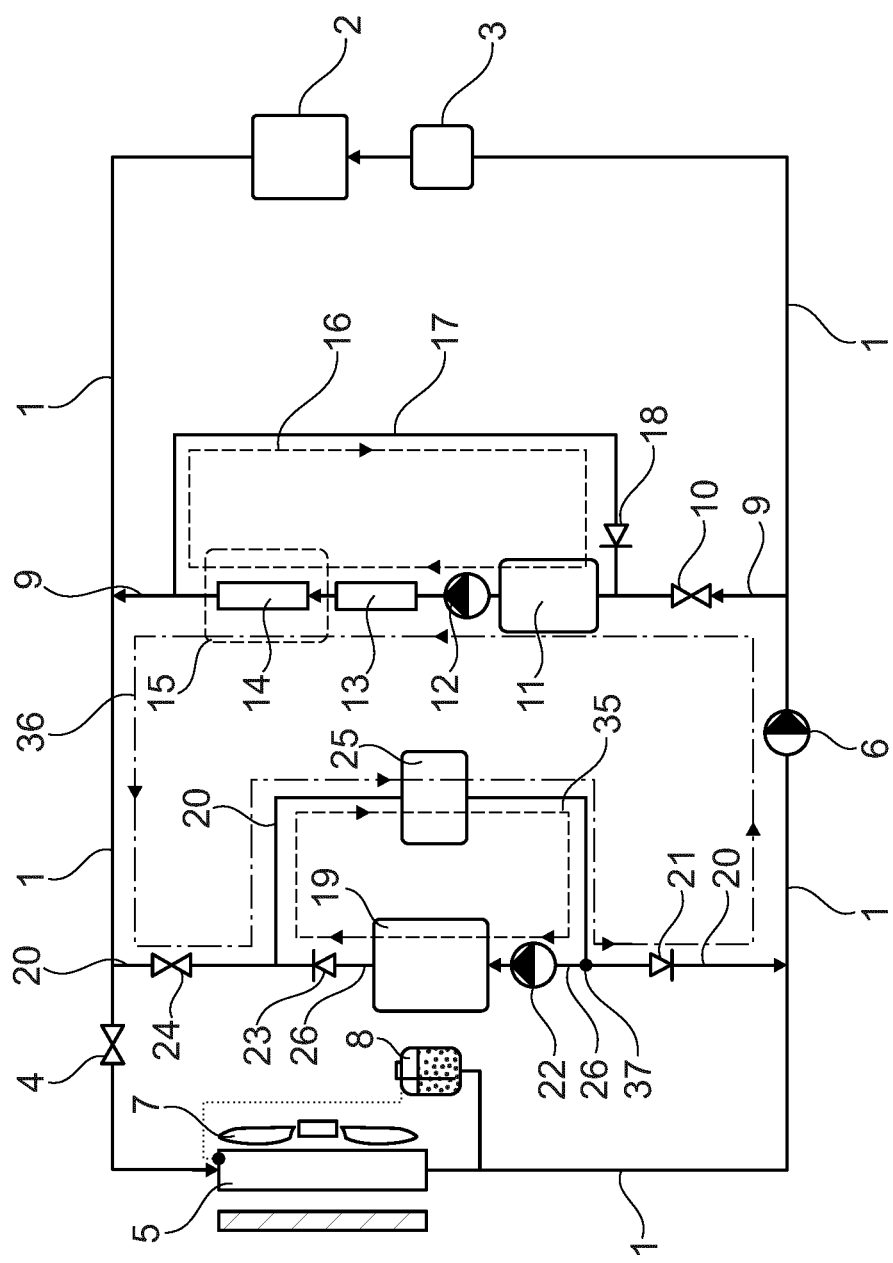
FIG. 1 shows schematically heating and cooling circuits of a thermal management system according to one exemplary embodiment of the invention.

FIG. 1 shows schematically heating and cooling circuits of a thermal management system according to one exemplary embodiment of the invention. The thermal management system is preferably installed in a motor vehicle, not illustrated, in particular in a passenger motor vehicle, for example a hybrid vehicle or electric vehicle. The thermal management system has a motor cooling circuit 1 in which an electric motor 2, a power electronics system 3, a cooler valve 4, an LT cooler 5, and a motor circuit pump 6 are arranged. Coolant, for example water mixed with additives, can be circulated in the motor cooling circuit 1. The cooler valve 4 makes it possible to permit or prevent a flow through the LT cooler 5, with intermediate positions of the cooler valve 4 also being possible. During the operation of the motor cooling circuit 1, with the cooler valve 4 open and motor circuit pump 6 activated, the coolant flows through the power electronics system 3, the electric motor 2 and the LT cooler 5 in this sequence. The LT cooler 5 is arranged such that ambient air can flow through it, and therefore it can be cooled by a headwind. The LT cooler 5 is assigned a fan 7 in order, in addition to the headwind, to convey an air flow through the LT cooler 5. An equalizing container 8 is assigned in a known manner to the motor cooling circuit 1.

A heating section 9 is provided parallel to the electric motor 2 and to the power electronics system 3. That is to say, the heating section 9 branches off from the motor cooling circuit 1 upstream of the power electronics system 3 (and therefore also upstream of the electric motor 2). In particular, this junction is located downstream of the motor circuit pump 6. The heating section 9 leads again into the motor cooling circuit 1 downstream of the electric motor (and therefore also downstream of the power electronics system 3). In particular, this inlet is located upstream of the cooler valve 4. The heating section 9 is thus parallel to the series circuit consisting of the electric motor 2 and the power electronics system 3.

The heating section 9 has a heating section valve 10, a water-cooled condenser 11, a heating circuit pump 12, an electrical heater 13 and an interior compartment heat exchanger 14. The interior compartment heat exchanger 14 is arranged inside an indicated air duct 15, for example an air flow duct, with which air is guided into an occupant compartment, not illustrated, of the motor vehicle such that the interior compartment can be heated by way of the interior compartment heat exchanger 14. In the heating section 9, the interior compartment heat exchanger 14 is arranged downstream of the electrical heater 13, the latter is arranged downstream of the condenser 11, and the latter is arranged downstream of the heating section valve 10. A flow through the heating section 9 can be permitted or prevented by way of the heating section valve 10, with intermediate positions of the heating section valve 10 also being possible.

In order to form an EDH heating circuit 16 (indicated by a dashed line), a heating return line 17 is provided which connects a downstream output of the interior compartment heat exchanger 14 to an upstream input of the condenser 11 to one another in a fluidically conducting manner. The heating return line 17 is provided with a one-way valve 18 which permits only a flow in one direction, specifically from the output of the interior compartment heat exchanger 14 to the input of the condenser 11. The interior compartment can be heated by way of the EDH heating circuit 16 by the coolant circulated by way of the heating pump 12 being heated at least by the electrical heater 13 and this thermal energy being output to the interior compartment heat exchanger 14. In other operating states, the coolant is additionally or alternatively heated by the condenser 11, for example by waste heat from an electrical energy store 19 (HVS), the electric motor 2, etc., depending on what thermal amounts are available from said components, which will be explained more precisely later on.

A chiller section 20 branches off from the motor cooling circuit 1 downstream of the electric motor 2 (and thus also downstream of the power electronics system 2). The chiller section 20 leads again into the motor cooling circuit 1 upstream of the power electronics system 3 (and thus also upstream of the electric motor 2). In particular, this inlet is located upstream of the motor circuit pump 6.

The chiller section 20 has a one-way valve 21 or nonreturn valve, a chiller 25 and a chiller valve 24. The direction of flow of the coolant in the chiller section 20 is predetermined by the one-way valve 21, and therefore the flow passes through the chiller valve 24, the chiller 25 and the one-way valve 21 only in this sequence. A flow through the chiller section 20 can be permitted or prevented by way of the chiller valve 24, with intermediate positions of the chiller valve 24 also being possible. An HVS section 26 has a series circuit consisting of an energy store pump 22, the electrical energy store 19 (HVS) and a one-way valve 23 or nonreturn valve. The HVS section 26 branches off from the chiller section 20 downstream of the chiller 25 and upstream of the one-way valve 21 and leads again into the chiller section 20 downstream of the chiller valve 24 and upstream of the chiller 25. The direction of flow of the coolant in the HVS section 26 is predetermined by the one-way valve 23. Coolant can thus flow through the HVS pump 22, the electrical energy store 19 and the one-way valve 23 only in this sequence.

Figure 2:
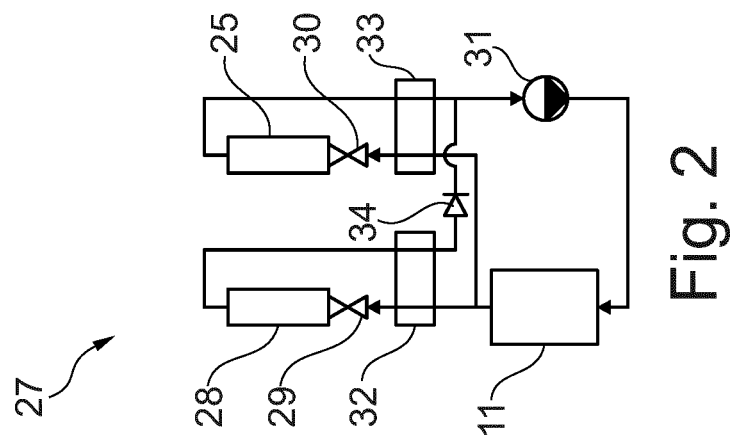
FIG. 2 shows schematically a refrigeration circuit of the thermal management system according to one exemplary embodiment of the invention.

FIG. 2 shows schematically a refrigeration circuit 27 of the thermal management system according to one exemplary embodiment of the invention. The refrigeration circuit 27 comprises the water-cooled condenser 11, the chiller 25 and an air conditioning evaporator 28 which is arranged in the air duct 15. A refrigerant, for example R134a, R1234yf, R1234ze or the like circulates through these components. The chiller 25 is a heat exchanger which transmits thermal energy between the refrigerant of the refrigeration circuit 27 and the coolant in the chiller section 20. For this purpose, the refrigerant and the coolant flow through the chiller 25 fluidically separated from one another. The air conditioning evaporator 28 is a heat exchanger which transmits thermal energy between the refrigerant of the refrigeration circuit 27 and air flowing in the air duct 15. For this purpose, the refrigerant and the air flow through the air conditioning evaporator 28 fluidically separated from one another. The air conditioning evaporator 28 is connected parallel to the chiller 25 in the refrigeration circuit 27. In order to set the cooling power of the air conditioning evaporator 28, a self-regulating expansion valve 29 which can be shut off electrically is connected upstream of the latter. An expansion valve 30 is connected upstream of the chiller 25. The interior compartment heat exchanger 14 and the air conditioning evaporator 28 are both arranged in the air duct 15. They can be used to heat, cool and/or dehumidify the interior compartment.

Furthermore, the refrigeration circuit 27 has an electrical compressor 31 with which the refrigerant can be compressed and conveyed. The refrigeration circuit 27 in FIG. 2 additionally has two inner heat exchangers 32, 33, of which one is assigned to the air conditioning evaporator 28 and the other to the chiller 25. The inner heat exchangers 32, 33 each have two chambers which are in thermal contact but through which the flow can pass in a fluidically separated manner from one another. One chamber here is connected upstream of the chiller/air conditioning evaporator and the other chamber is connected downstream of the chiller/air conditioning evaporator. The flow passes through the chambers in opposite directions and these chambers thus form a counterflow heat exchanger. The predominantly liquid refrigerant coming from the compressor thus flows through the inner heat exchangers in one chamber and the predominantly gaseous refrigerant coming from the chiller/air conditioning evaporator thus flows through the inner heat exchangers in the other chamber. Thermal energy is extracted from the predominantly liquid refrigerant by the inner heat exchanger, which leads to an even greater fraction being liquefied. This energy is supplied to the predominantly gaseous refrigerant, which leads to an even greater fraction being evaporated and being present in gaseous form. This serves for increasing the power and efficiency of the chiller 25 and of the air conditioning evaporator 28. The inner heat exchangers 32, 33 are not necessarily required for the operation of the refrigeration circuit 27. A nonreturn valve 34 or one-way valve is arranged downstream of the air conditioning evaporator 28. Further variants which are not shown emerge through the use of a plurality of chillers 25, a plurality of condensers 11 or a plurality of separate refrigeration circuits 27.

Downstream of the condenser 11, the refrigeration circuit 27 branches into the parallel sections, of which one leads to the air conditioning evaporator 28 and the other to the chiller 25. From this point, the flow passes through the inner heat exchanger 32, the expansion valve 29, the air conditioning evaporator 28, the inner heat exchanger 32, the nonreturn valve 34 and the compressor 31 in this sequence in the one section. In the other section, the flow passes through the inner heat exchanger 33, the expansion valve 30, the chiller 25, the inner heat exchanger 33 and the compressor 31 in this sequence. The parallel sections are brought together again upstream of the compressor 31.

Some operating modes of the thermal management according to exemplary embodiments of the invention will be described below.

The EDH heating circuit 16 has already been described with reference to FIG. 1. By circulation of coolant in the latter, the interior compartment can be heated by the electrical heater 13. In particular, the heating section valve 10 is closed in this operating state.

Additionally or alternatively, it is possible to circulate coolant through the energy store 19, the one-way valve 23, the chiller 25, the HVS pump 22 and back to the energy store 19 along an HVS chiller circuit 35 (indicated by a dashed line) in order to admit waste heat of the energy store 19 into the chiller 25 and to admit this thermal energy via the chiller 25 and the refrigeration circuit 27 into the condenser 11. This thermal energy is then admitted from the condenser 11 into the EDH heating circuit 16 and/or the heating section 9 (what is referred to as thermal pump functionality). With this operating mode, the energy store 19 can be cooled while the waste heat from the energy store 19 is supplied via the chiller 25, the refrigeration circuit 27 and the condenser 11 to the interior compartment heat exchanger 14 in order thus to heat the occupant compartment. The electrical heater 13 is switched on or off here depending on the heating requirement.

Additionally or alternatively, it is possible to circulate coolant through the electric motor 2, the chiller section 20 (i.e. the chiller valve 24, the chiller 25 and the one-way valve 21), the motor circuit pump 6, the power electronics system 3 and back to the electric motor 2. The electric motor 2 and/or the power electronics system 3 can thereby be cooled and the waste heat thereof admitted into the chiller 25 and thus, analogously to the waste heat of the energy store 19, as described above, into the heating section 9 and/or into the EDH heating circuit 16 (thermal pump functionality).

In a further mode, for example if there is an excess of heat, the coolant can be circulated in the motor cooling circuit 1 such that waste heat from the electric motor 2 and/or the power electronics system 3 is output to the ambient air via the LT cooler 5.

Furthermore, the following heating mode is provided in which the coolant is circulated along a heating circuit 36 indicated by a chain-dotted line. In the heating circuit 36, the coolant is circulated through the heating section 9, the chiller section 20, the motor circuit pump 6 and back into the heating section 9. In particular, during this heating mode, the HVS pump 22 is switched off, and therefore no coolant flows through the energy store 19. In particular, in this heating mode, neither waste heat from the electric motor 2 nor waste heat from the power electronics system 3 nor waste heat from the energy store 19 is admitted into the chiller 25. The flow thus passes through the chiller 25 although no waste heat is available from these components. That is to say, the chiller 25 is subjected exclusively to thermal energy from the electrical heater 13. According to an exemplary embodiment of the invention, however, the refrigeration circuit 27 is operated such that residual heat (which remains after the flow passes through the interior compartment heat exchanger 14) coming from the electrical heater 13 is admitted via the chiller 25 into the refrigeration circuit 27. In the refrigeration circuit 27 which is operated simultaneously to the heating circuit 36, this residual heat and additionally thermal energy admitted from the electrical compressor 31 into the refrigeration circuit 27 is admitted into the condenser 11. The condenser 11 outputs this amount of thermal energy to the coolant in the heating section 9. A thermal pump mode is thus virtually realized only in order to use thermal energy, generated by the electrical compressor 31, for heating purposes.

Furthermore, an operating state is provided which is designed as described above, with the difference that the electrical heater remains at least temporarily switched off and the sole thermal source is the electrical compressor. Therefore, a thermal pump mode is virtually realized only in order to use exclusively thermal energy, generated by the electrical compressor 31, for heating purposes.

The following HVS heating mode is additionally provided. The above-described heating mode is realized here, with the exception that the HVS pump 22 is switched on. As a result, the HVS chiller circuit 35 is operated simultaneously to the above-described heating circuit 36. The coolant thereby passes through downstream of the chiller 25 and thus also heats the electrical energy store 19. The cooled coolant which has passed through the energy store 19 subsequently mixes with the coolant coming from the heating section 9, as a result of which the coolant temperature is lowered. The advantage of this HVS heating mode is in that the coolant coming from the heating section 9 via the chiller valve 24 is possibly too hot for the energy store 19. The coolant is thus first of all conducted through the chiller 25 so that the coolant temperature is lowered. Downstream of the chiller 25, the coolant is conducted at a branching point 37 partially through the energy store 19 and partially via the one-way valve 21 back to the heating section 9. A dividing ratio at the branching point 37 creates a control option by way of which the cooling of the energy store 19 can be controlled and/or regulated. Furthermore, the option is thereby created of using only one single electrical heater 13 and of nevertheless obtaining different admission temperatures at the energy store 19 and at the interior compartment heat exchanger 14.

Figure 3:
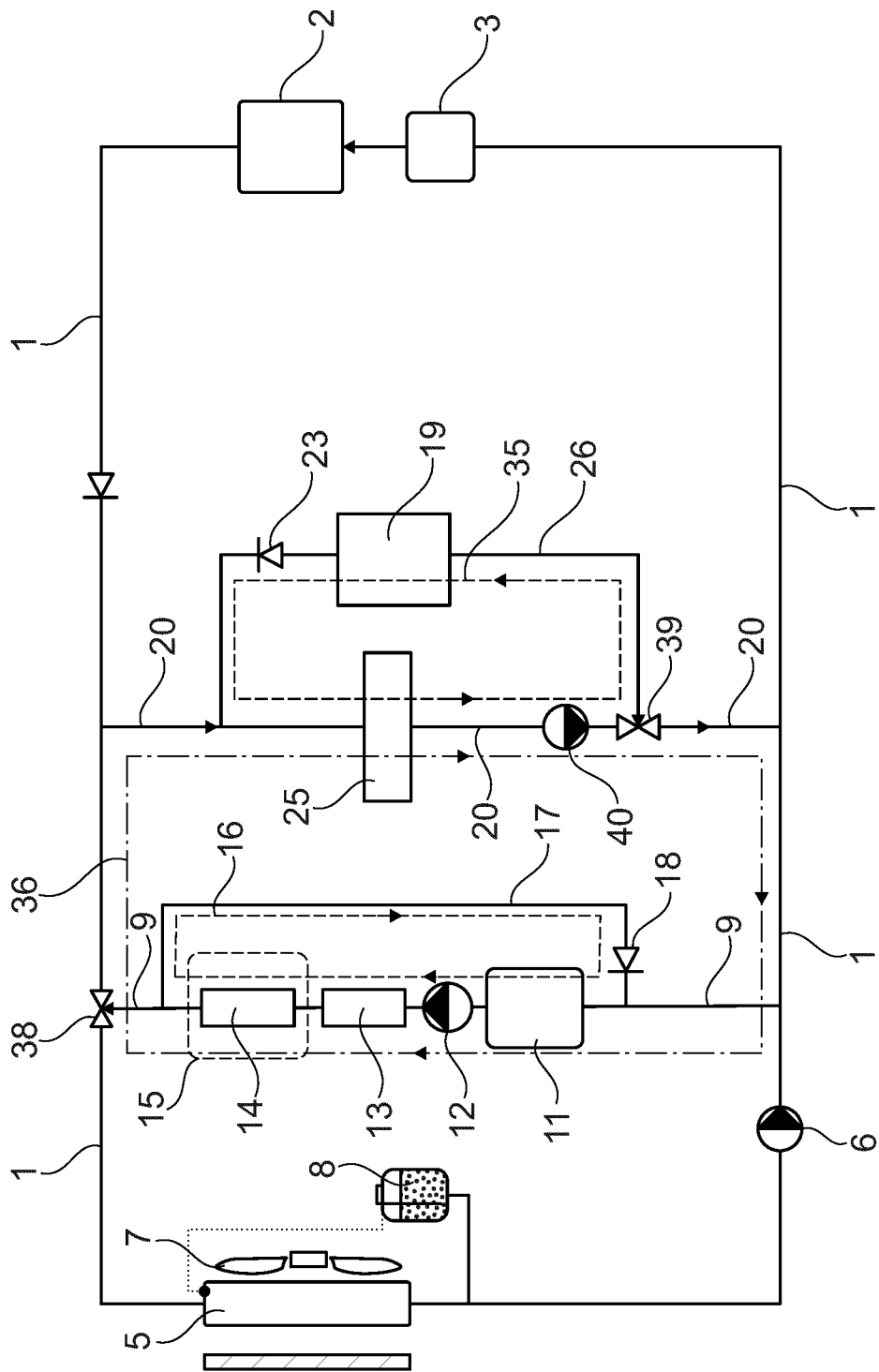
FIG. 3 shows schematically heating and cooling circuits of the thermal management system according to a modification of the exemplary embodiment from FIG. 1.

FIG. 3 shows schematically heating and cooling circuits of the waste management system according to one modification of the exemplary embodiment from FIG. 1. In conjunction with this modification, only the differences over the previously described exemplary embodiment will be described, otherwise reference is made to the description above.

The heating section 9 in FIG. 3 differs from that described in conjunction with FIG. 1 in that the heating section valve 10 has been omitted and, instead, a control valve or a cooler/heating section valve 38 designed in particular as a ⅔-way valve has been provided at the inlet of the heating section 9 into the motor cooling circuit 1. The cooler/heating section valve 38 also takes on the function of the cooler valve 4, for which reason the latter is likewise dispensed with. A flow through the LT cooler 5 can be permitted or prevented by way of the cooler/heating section valve 38, with intermediate positions also being possible. Furthermore, a flow through the heating section 9 can be permitted or prevented by way of the cooler/heating section valve 38, with intermediate positions also being possible.

The chiller section 20 differs from that described in conjunction with FIG. 1 in that the chiller valve 24 and the one-way valve 21 have been omitted and, instead, a control valve or a HVS chiller valve 39 designed in particular as a ⅔-way valve has been provided. A flow through the chiller section 20 can be permitted or prevented by way of the HVS chiller valve 39, with intermediate positions also being possible. Furthermore, a flow through the HVS section 26 can be permitted or prevented by way of the HVS chiller valve 39, with intermediate positions also being possible. Moreover, a chiller section pump 40 is provided in the chiller section 20 and the HVS pump 20 is instead omitted. When the HVS chiller circuit 35 is in operation, the chiller section pump 40 then has the same function as the HVS pump 20, only it is arranged at another location in the HVS chiller circuit 35. More precisely, the chiller section pump 40 is arranged downstream of the chiller 25 and upstream of the control valve 39. When the HVS chiller circuit 35 is not in operation, but coolant flows through the chiller section 20, the coolant flow can be conveyed along the chiller section 20 through the chiller 25 by way of the chiller section pump 40.

The motor circuit pump 6 is positioned somewhat differently in FIG. 3 than in FIG. 1; more precisely, the motor circuit pump 6 is arranged downstream of the LT cooler 5 and, in the motor circuit 1, upstream of the junction of the heating section 9 and upstream of the inlet of the chiller section 20.

While the invention has been illustrated and described in detail in the drawings and in the description above, this description should be understood as illustrative or by way of example and not as restrictive, and it is not the intention to restrict the invention to the exemplary embodiment disclosed. The simple fact that certain features are mentioned in different dependent claims is not intended to indicate that a combination of these features could not be advantageously also used.

LIST OF REFERENCE SIGNS

1 Motor cooling circuit
2 Electric motor
3 Power electronics system
4 Cooler valve
5 LT cooler
6 Motor circuit pump
7 Fan
8 Equalizing container
9 Heating section
10 Heating section valve
11 Water-cooled condenser
12 Heating pump
13 Electrical heater
14 Interior compartment heat exchanger
15 Air duct
16 EDH heating circuit
17 Heating return line
18 One-way valve
19 Electrical energy store
20 Chiller section
21 One-way valve
22 HVS pump
23 One-way valve
24 Chiller valve
25 Chiller
26 HVS section
27 Refrigeration circuit
28 Air conditioning evaporator
29 Expansion valve
30 Expansion valve
31 Electrical compressor
32 Inner heat exchanger
33 Inner heat exchanger
34 Nonreturn valve
35 HVS chiller circuit
36 Heating circuit
37 Branching point 38 Heating section valve
39 HVS chiller valve
40 Chiller section pump

What is claimed is:

1. A thermal management system for a motor vehicle, the thermal management system comprising:
   a heating circuit comprising an interior compartment heat exchanger;
   a refrigeration circuit comprising a compressor;
   a condenser which is arranged in the heating circuit and in the refrigeration circuit, wherein the heating circuit and the refrigeration circuit are fluidically separated from one another in the condenser;
   a chiller which is arranged in the heating circuit and in the refrigeration circuit, wherein the heating circuit and the refrigeration circuit are fluidically separated from one another in the chiller; and
   a high-voltage storage (HVS) section which includes an electrical energy store, a pump, and a one-way valve, and which branches off from the heating circuit downstream of the chiller and leads into the heating circuit upstream of the chiller, wherein the HVS section is activatable and deactivatable,
   wherein, in a heating mode, the interior compartment heat exchanger, the chiller and the condenser are connected in series in the heating circuit.

2. The thermal management system according to claim 1, wherein:
   the heating circuit further comprises an electrical heater, and
   in the heating mode, the electrical heater, the interior compartment heat exchanger, the chiller and the condenser are connected in series in the heating circuit.

3. The thermal management system according to claim 2, wherein, in the heating mode, the electrical heater, the interior compartment heat exchanger, the chiller and the condenser are connected in series in this sequence in the heating circuit.

4. The thermal management system according to claim 1, further comprising an electric duct heater (EDH) heating circuit which branches off from the heating circuit downstream of the interior compartment heat exchanger and leads into the heating circuit upstream of the condenser.

5. The thermal management system according to claim 1, wherein a volume fraction of coolant branching off from the heating circuit into the HVS section is adjustable.

6. The thermal management system according to claim 1, further comprising a control valve at the junction of the HVS section.

7. The thermal management system according to claim 1, further comprising a control valve between the interior compartment heat exchanger and the chiller.

8. A motor vehicle comprising the thermal management system according to claim 1.

9. A method for thermal management of a motor vehicle, the method comprising:
   circulating coolant in a heating circuit by a series connection having an interior compartment heat exchanger, a chiller and a condenser;
   simultaneously circulating refrigerant in a refrigeration circuit by a series connection having a compressor, the condenser and the chiller; and
   activating and deactivating a high-voltage storage (HVS) section which includes an electrical energy store, a pump, and a one-way valve, and which branches off from the heating circuit downstream of the chiller and leads into the heating circuit upstream of the chiller.

10. The method according to claim 9, wherein, while circulating the coolant in the heating circuit, the coolant is circulated by a series connection having an electrical heater, the interior compartment heat exchanger, the chiller and the condenser.

11. The method according to claim 10, further comprising:
    removing heating circuit thermal energy from the heating circuit by the chiller;
    transmitting the heating circuit thermal energy from the chiller via the refrigeration circuit into the condenser;
    subjecting the condenser to additional compressor thermal energy originating from an output from the compressor, and
    introducing the heating circuit thermal energy and the compressor thermal energy via the condenser into the heating circuit.

12. The method according to claim 11, wherein the heating circuit thermal energy originates exclusively from the electrical heater.

13. The method according to claim 10, wherein, while circulating the coolant in the heating circuit, the coolant passes through the electrical heater, the interior compartment heat exchanger, the chiller and the condenser in this sequence.

14. The method according to claim 9, further comprising:
    branching off coolant from the heating circuit downstream of the chiller,
    guiding the coolant through the electrical energy store, and
    re-introducing the coolant into the heating circuit upstream of the chiller.

15. The method according to claim 14, further comprising adjusting a volume fraction of the coolant that is branched off from the heating circuit into the HVS section.

* * * * *